United States Patent [19]

Huntley

[11] Patent Number: 5,010,989
[45] Date of Patent: Apr. 30, 1991

[54] CLUTCH CONTROL FOR HIGH-RESPONSE CONTINUOUSLY VARIABLE TRANSMISSION

[75] Inventor: Peter Huntley, Ithaca, N.Y.

[73] Assignee: Borg-Warner Automotive, Inc., Sterling Heights, Mich.

[21] Appl. No.: 422,627

[22] Filed: Oct. 17, 1989

[51] Int. Cl.⁵ .............................................. B60K 41/02
[52] U.S. Cl. ................................ 192/0.033; 192/0.076
[58] Field of Search ................ 192/0.033, 0.076, 0.096

[56] References Cited

U.S. PATENT DOCUMENTS

| | | |
|---|---|---|
| 2,878,690 | 3/1959 | Capron et al. . |
| 4,387,608 | 6/1983 | Mohl et al. ............................. 74/866 |
| 4,433,594 | 2/1984 | Smirl ................................... 475/206 |
| 4,458,318 | 7/1984 | Smit et al. ......................... 364/424.1 |
| 4,502,579 | 3/1985 | Makita ......................... 192/0.076 X |
| 4,509,625 | 4/1985 | Tellert ............................... 192/0.033 |
| 4,542,665 | 9/1985 | Yamamuro et al. ................... 74/866 |
| 4,583,627 | 4/1986 | Kumura et al. .................... 192/0.076 |
| 4,623,052 | 11/1986 | Watanabe et al. ........... 192/0.076 X |
| 4,638,898 | 1/1987 | Braun ........................... 192/0.076 X |
| 4,648,496 | 3/1987 | Petzold et al. .................... 192/0.076 |
| 4,653,621 | 3/1987 | Oshiage ............................ 192/0.032 |
| 4,663,714 | 5/1987 | Cornell et al. .................... 364/424.1 |
| 4,665,773 | 5/1987 | Hiramatsu et al. .................... 74/866 |
| 4,730,712 | 3/1988 | Ohkumo ............................ 192/0.076 |
| 4,793,454 | 12/1988 | Petzold et al. .................... 192/0.032 |
| 4,805,751 | 2/1989 | Ohkumo et al. .................. 192/0.076 |
| 4,811,222 | 3/1989 | Watanabe et al. ........... 192/0.033 X |
| 4,825,991 | 5/1989 | Ohkumo ............................ 192/0.052 |
| 4,867,287 | 9/1989 | Hayashi ............................ 192/0.076 |

FOREIGN PATENT DOCUMENTS

| | | |
|---|---|---|
| 0196807 | 3/1986 | European Pat. Off. . |
| 0044343 | 2/1989 | Japan ................................ 192/0.076 |
| 2058256 | 4/1981 | United Kingdom . |

Primary Examiner—Rodney H. Bonck
Attorney, Agent, or Firm—Neuman, Williams et al.

[57] ABSTRACT

A continuously variable transmission system having a controllable variable speed component and a fluid controlled clutch includes a schedule for providing a desired engine speed in response to the engine throttle angle and engine torque, and a system element for providing an error signal representative of the difference between desired and actual engine speeds. The error signal is developed to provide an output signal representative of a required clutch pressure that allows clutch slippage sufficient to unload the engine and allow it to rapidly reach its desired speed. The clutch is reengaged when the engine speed and the ratio of the variable speed component have reached or approached their required values.

16 Claims, 2 Drawing Sheets

CLUTCH CONTROL FOR HIGH-RESPONSE CONTINUOUSLY VARIABLE TRANSMISSION

BACKGROUND OF THE INVENTION

1. Field of the Invention

The invention relates to the control of a continuously variable transmission for a vehicle power train and, more particularly, to the control of clutch slippage in the power train of a vehicle in response to an abrupt increase in demanded power.

2. Description of Prior Art

A continuously variable transmission (CVT) control system typically utilizes a pair of adjustable pulleys, each pulley having at least one sheave that is axially fixed and another sheave that is axially movable relative to the first and a flexible belt of metal or elastomeric material that intercouples the pulleys. The inner faces of the sheaves of the pulley are bevelled or chamfered so that as the axially displaceable sheave moves relative to the fixed sheave, the effective pulley diameter may be adjusted.

Each displaceable sheave includes a fluid constraining chamber for receiving fluid to move the sheave and thus change the effective pulley diameter. As fluid is exhausted from the chamber, the pulley diameter changes in the opposite sense. Generally, the effective diameter of one pulley is moved in one direction as the effective diameter of the other pulley is moved in the other. This enables the ratio between the pulleys to be adjusted. The output of the secondary pulley drives the drive train of the vehicle which in the preferred embodiment is connected to the secondary pulley through a clutch. Reference to U.S. Pat. No. 4,433,594 entitled "Variable Pulley Transmission" assigned to the assignee of this application provides further information in relation to CVTs and is incorporated herein by reference.

Swift vehicle acceleration in response to an abrupt increase in demanded power is a highly desirable characteristic in all vehicles, including those incorporating a continuously variable transmission. To achieve swift acceleration, it is necessary to be able to quickly increase the fuel and air content in the combustion chambers of the engine and also to promote the swift increase in engine speed and enable this to be transferred rapidly to the drive train output.

Vehicles with transmissions having a wide ratio spread, such as continuously variable transmissions, tend to be operated at relatively low engine speed and relatively open throttle. Therefore, although fuel and air can be increased in the engine on demand, the amount of increase available is relatively small. As a consequence, immediately after an abrupt increase in demanded power, the actual engine power increase depends mainly on the rate at which the engine speed can be increased. Also, an engine will be forced to operate under high-torque low speed conditions that can cause surging, uneven firing and excessive exhaust emissions.

A typical response to the problem of high-torque and low speed engine output in CVTs is to provide a control system to vary the ratio in the variable speed component as quickly as possible towards a low ratio. During abrupt increases in the demanded power, the rate of rotation of the CVT output shaft is slowed down transferring some kinetic energy from the vehicle mass to rotation of the crankshaft. In some instances, the ratio can be decreased so fast that in response to an increase in demanded power, the vehicle is suddenly decelerated.

Changing the ratio to remove the problems encountered with surge and uneven firing associated with abrupt increases in power demand, requires an auxiliary control system. However, in many transmission control systems it is difficult to achieve an adequate rate of change without imposing unacceptably high parasitic losses under other operating conditions, such as the steady state. As the periods of operation during which abrupt increases in power are demanded are likely to be comparatively short, the use of such an auxiliary control system can result in a parasitic power loss during the majority of the operating cycle.

It is desirable therefore to provide an alternative manner of improving a vehicle's responsiveness during abrupt changes in demanded power for vehicles having continuously variable transmissions so as not to produce initial vehicle retardation and not to precipitate parasitic power loss during other operating conditions.

OBJECTS OF THE INVENTION

Accordingly it is an object of this invention to provide an improved control system for a continuously variable transmission system that generally overcomes the shortcomings of control systems used previously and meets the aforementioned requirements.

It is a specific object of this invention to provide a control system that enables the power train of a continuously variable transmission to respond to abrupt increases in demanded power.

It is another object of this invention to provide a control system that operates under conditions of abrupt change in demanded power but does not cause a parasitic power loss during other engine operating conditions.

Other objects, advantages and features of this invention will become apparent on reading the following description and appended claims, and upon reference to the accompanying drawings.

SUMMARY OF THE INVENTION

The control system of this invention utilizes controlled slippage in an adjustable clutch to enable the engine to accelerate in response to increased power demand, regardless of the ratio of the variable-speed component. This enables the engine delivered power to increase as swiftly as possible and minimizes the problems associated with increased torque.

In accordance with one embodiment of the present invention, a control system for a continuously variable transmission system having a variable speed component and an adjustable clutch which achieves the foregoing objects includes means for providing a desired engine speed and means for comparing the desired engine speed with an actual engine speed to provide a first error signal. The first error signal is utilized to provide an output signal representative of a required clutch pressure to allow slippage of the clutch to the extent necessary to enable the engine to accelerate by the required amount regardless of the rate of change of the ratio of the variable speed component. Re-engagement of the clutch is timed to occur when the engine speed and ratio of the variable speed component have reached or approached their required values.

The adjustable clutch may be fluid controlled to enable the required clutch slippage to be realized. The output signal representative of a required clutch pressure is then limited by the temperature of the clutch cooling fluid that rises when the clutch is slipping due to power dissipation. The system may include means to prevent slippage of the clutch when the temperature of the fluid exceeds a predetermined upper threshold. One means by which this is accomplished includes the development of a signal in response to the ratio of the continuously variable component and the engine torque to provide a signal that is representative of the clutch pressure required for non-slip operation of the clutch. This signal is output in preference to a signal promoting slip when the temperature of the clutch cooling fluid is greater than the predetermined threshold.

The signal representative of the non-slip clutch pressure for normal operation is computed from the engine speed and the speed of the input to the clutch to find the ratio of the continuously variable component. This ratio and the engine torque that is computed from the throttle angle and the engine speed may be used in conjunction with a look-up table to determined an appropriate non-slip clutch pressure.

The signal representative of the required clutch pressure may be determined from a stored look-up table responsive to an input of the engine speed error. The look-up table may be biased to limit the value of the output signal so as not to exceed a predetermined level of clutch slippage. This ensures that vehicle deceleration is kept to within acceptable predetermined limits when a sudden increase in demanded power is experienced.

BRIEF DESCRIPTION OF THE DRAWINGS

For a more complete understanding of this invention, reference should now be made to the embodiment illustrated in greater detail in the accompanying drawings and described by example only. In the drawings.

DETAILED DESCRIPTION

Figure 1:
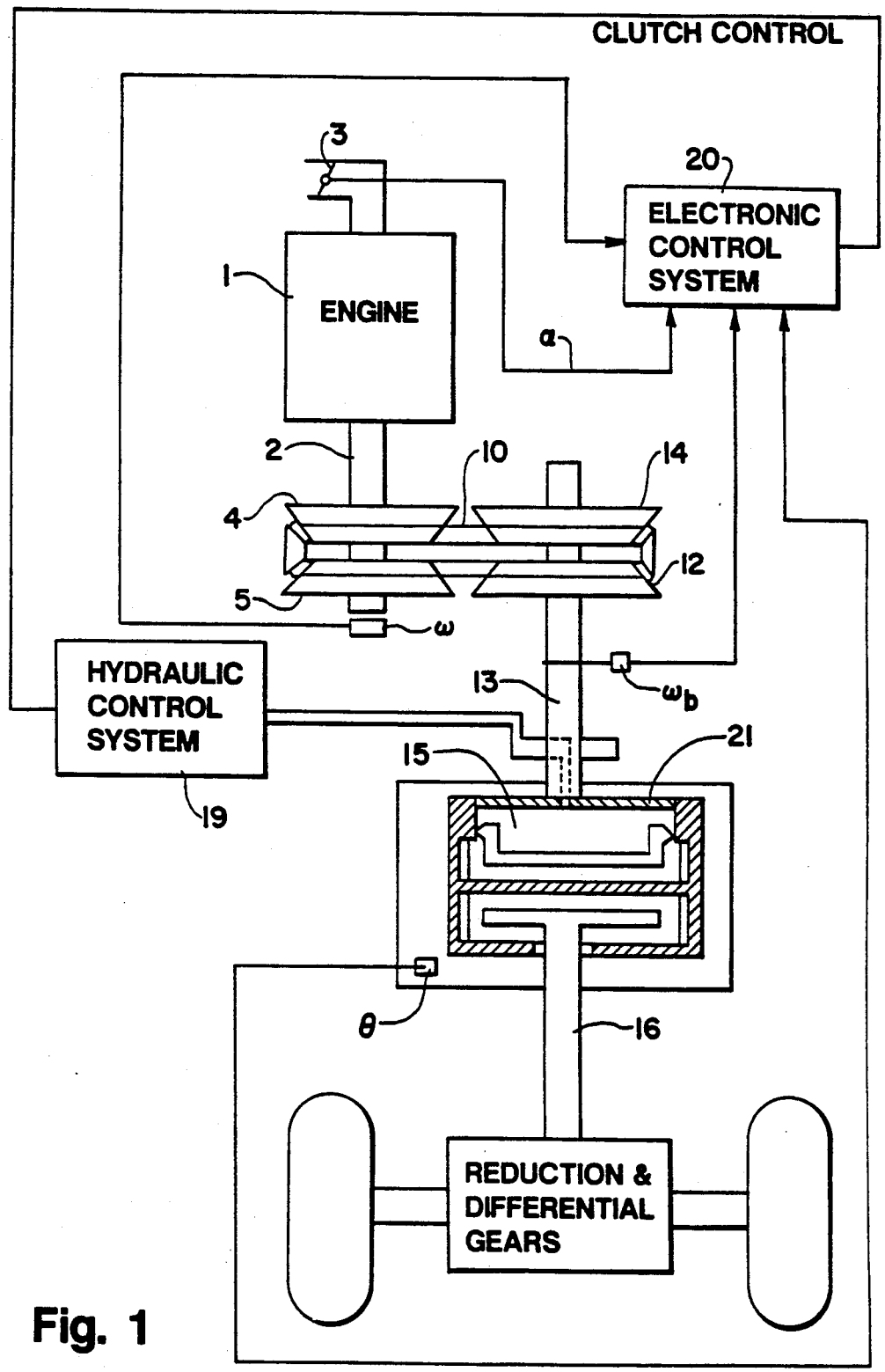
FIG. 1 is a schematic representation of a continuously variable transmission system.

FIG. 1 is a schematic representation of a continuously variable transmission system showing the location of the sensors required for implementation of the present invention. The engine 1 generates an output torque on shaft 2 depending upon the engine speed $\omega_e$ and upon the angle $\alpha$ of a throttle 3. The shaft 2 is connected to a primary pulley 4 having one movable sheave 5 that is regulated to move inward or outward in accordance with the pressure of the fluid in a servo chamber supplied by a hydraulic circuit (not shown). A transmission belt 10 connects the primary pulley 4 to the secondary pulley 12. The torque supplied to the clutch input shaft 13 depends upon the ratio of the belt operating radii on pulleys 4 and 12 and upon the engine torque. As the sheave 5 is moved inward the belt is pushed away from the axis of the primary pulley 4 and pulled toward the axis of the secondary pulley 12. This adjusts the ratio between the pulleys and thereby the torque supplied to the clutch input shaft 13. By regulating the pressure of the fluid at the movable sheave 14 of the secondary pulley 12, the position of the movable sheave 14 of the secondary sheave can be altered to adjust the tension in the belt to prevent it from slipping and causing damage to itself and the pulleys.

The clutch servo-chamber 15 provides pressure to the clutch to regulate the amount of slippage between the clutch input shaft 13 and the clutch output shaft 16. The hydraulic control system 19 supplying fluid at the required pressure to servo-chamber 15 is controlled by electronic control system 20. The control system 20 receives inputs representing the throttle angle $\alpha$ the engine speed $\omega_e$, the output of the variable speed component $\omega_b$ the temperature of the cooling fluid $\theta$. The engine speed $\omega_e$ is taken to be equal to the angular velocity of the primary sheave 4. The output speed of the variable-speed component $\omega_b$ is measured at the clutch input shaft 13 connecting the secondary sheave 12 to the clutch 21. The temperature of the clutch-cooling fluid is measured by a temperature sensor placed conveniently in the fluid circuit, such as the sump.

Figure 2:
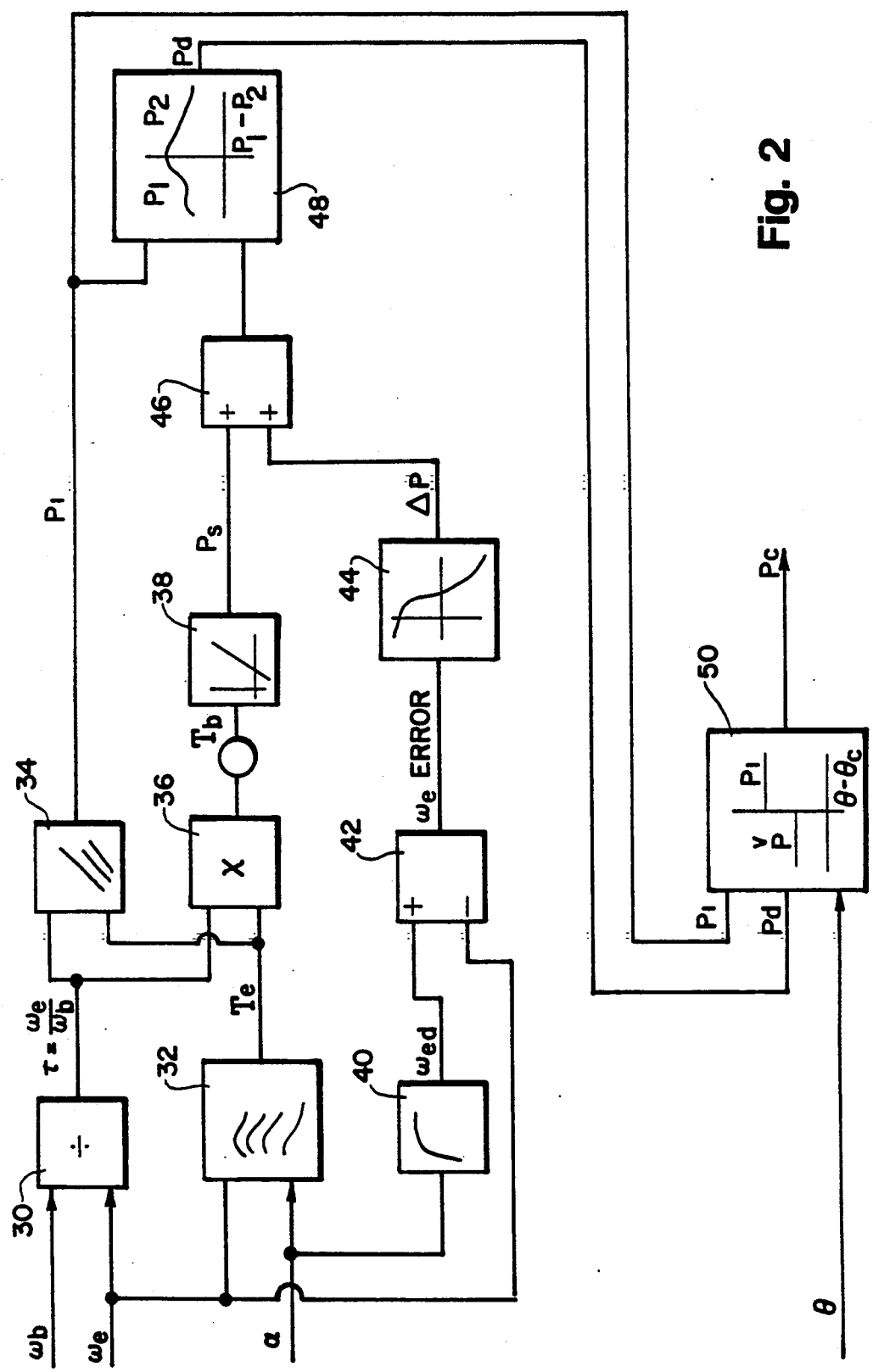
FIG. 2 is a block diagram representation of a clutch control system according to the present invention.

The operation of the electronic controller 20 is shown in greater detail in the block diagram of FIG. 2. Block 30 receives as inputs the engine speed $\omega_e$ and the output of the variable speed component $\omega_b$ and computes the ratio r across the variable component by dividing $\omega_e$ by $\omega_b$. Block 32 receives the throttle angle $\alpha$ and the engine speed $\omega_e$ and determines the engine torque $T_e$. The schedule for determining the engine torque may be formed from a look-up table. The ratio r and the engine torque $T_e$ are input to block 34 where the clutch pressure $P_1$ appropriate for normal non-slip operation at the particular engine torque and ratio is computed again with reference to a look-up table and with interpolation between discrete points. An example of a suitable look-up table can be found in U.S. patent application Ser. No. 7/936,527 filed Dec. 1, 1986 and assigned to the same assignee as this application. At block 36, the ratio r and the engine torque $T_e$ are input to compute the torque delivered from the variable speed component, $T_b$, assuming a constant known efficiency of the variable speed component.

The torque output of the variable speed component $T_b$ is taken to be equal to the torque applied to the clutch. It may be possible to measure the clutch input torque directly or to estimate it in some other way. For most purposes, however the assumption used in this embodiment is quite sufficient. Once a determination of $T_b$ has been made this value is input into block 38 where a pressure that corresponds to the clutch just slipping $P_s$ is computed. The method of computation is described in further detail in U.S. Pat. No. 4,793,454 assigned to the same assignee as this application.

For normal, non-slip operation, the clutch must be engaged with $P_1$ greater than $P_s$, to give the clutch additional slip-resistant capacity in case of shock torque loads on the vehicle driven wheels.

It is assumed that for each throttle angle $\alpha$ there is a desired engine speed $\omega_{ed}$ for optimum power train operation. This is computed at block 40. The throttle angle is input and the desired engine speed $\omega_{ed}$ is output in accordance with a stored schedule. Further details of a suitable schedule can be found in U.S. Pat. No. 4,811,225 assigned to the same assignee as this application. The error $\omega_{e\ error}$ is computed in block 42 as the difference between the desired engine speed $\omega_{ed}$ and the actual engine speed $\omega_e$.

The output signal $\omega_{e\ error}$ is input to block 44 where $\Delta P$ is computed in accordance with a stored schedule. The clutch pressure modification, $\Delta P$, corresponds to the extent of slip at the clutch to allow the engine to be unloaded sufficiently to enable it to reach the desired engine speed. Clutch slip inevitably leads to a reduction in output torque and consequent vehicle deceleration. The schedule 44 used to calculate the extent of clutch slip is therefore designed so that there is a maximum permissible slip which is determined by the extent to which short-term vehicle deceleration can be tolerated. The schedule is also designed to encourage clutch lock-up when the engine speed and the ratio between the variable components have reached, or approached their required values, i.e., when the error produced at block 42 approaches zero.

At block 46, the determined value of $\Delta P$ is added to the value of $P_s$ computed at block 38 to give an output $P_2$ that corresponds to the clutch pressure required to allow the clutch to slip by the required amount.

Block 48 is a "lowest wins" comparator such that its output $P_d$ is the lowest of the two inputs $P_1$ and $P_2$ computed at blocks 34 and 46 respectively. This ensures that the pressure at the clutch does not exceed the value necessary for normal non-slip operation of the clutch. When, as a result of a rapid increase in throttle angle $\alpha$, there is a large discrepancy between the desired engine speed and the actual engine speed, the initial value of $\Delta P$ is correspondingly large in the negative direction. This means that $P_2$ is low relative to the pressure for incipient slip $P_s$, and $P_2$ will be less than $P_1$. In these circumstances, the output $P_d$ from block 48 will be equal to $P_2$. As the engine accelerates, $\Delta P$ increases and approaches zero; therefore the difference between $P_1$ and $P_2$ will decrease. The clutch torque will therefore increase to balance the engine torque. For small negative speed errors the schedule in block 44 is designed to make $\Delta P$ large enough in the positive direction so that $P_2$ is greater than $P_1$, or $P_d$ equals $P_1$ as required in normal operation, to facilitate clutch reengagement when the engine speed and ratio of the variable speed components have reached or approached their required values.

The output of block 48 and the output from block 34 are then both input at block 50. Block 50 is designed to regulate the clutch pressure in response to the temperature of the clutch fluid. When the clutch slips, heat is dissipated in the clutch cooling fluid. Once the temperature of the cooling fluid 8 has reached a predetermined upper limit $\theta_c$ it is no longer desirable for the clutch to slip as further heating of the clutch cooling fluid would result in adverse effect to the clutch. Block 50 compares the temperature of the clutch cooling fluid 8 with the predetermined upper limit $\theta_c$ and outputs a clutch pressure $P_c$ representative of the most desirable clutch pressure. If $\theta$ is below the upper limit $\theta_c$, the pressure signal $P_c$ output from block 50 is equal to the calculated desired pressure $P_d$. If, however, $\theta$ exceeds $\theta_c$, it is not desirable for the clutch to slip and the output $P_c$, of block 50 is made equal to the non-slip pressure $P_1$ regardless of the engine speed error. The input signal $\theta$ must be suitably filtered to prevent oscillation of $P_3$ between the values $P_1$ and $P_d$.

The utilization of clutch slippage unloads the engine during periods where rapid increase in engine speed is required regardless of the ratio of the variable speed component. Clutch slip only occurs during periods of rapid acceleration and does not cause any parasitic power loss at other times. By providing a mechanism by which the slippage can be limited to maximum value, excessive vehicle deceleration is avoided and the vehicle is able to react responsively and smoothly to an abrupt increase in power-demand. The entire system is safeguarded against excessive clutch fluid temperature by the implementation of a means of ensuring that the clutch is locked up when the fluid temperature rises above a predetermined level to prevent further heating of the fluid. The system provides for high response to an abrupt increase in power demand without requiring auxiliary circuitry that promotes a parasitic power loss during other operating conditions.

While one preferred embodiment of this invention is illustrated, it will be understood, of course that the invention is not limited to this embodiment. Those skilled in the art to which the invention pertains may make modifications and other embodiments employing the principles of the invention, particularly upon considering the foregoing teachings. Other embodiments include, without limitation, transmission configurations with several variable speed components and/or several clutches, in which one or more of the clutches could be positioned in series with one or more of the variable speed components and positioned between the engine and the variable speed components, or, alternatively, could be placed in parallel with one or more of the variable speed components.

Other embodiments include, without limitation, methods of measuring engine load as alternatives to the throttle angle $\alpha$, such as air flow rate or manifold pressure.

What is claimed is:

1. A continuously variable transmission system having a controllable variable speed component and an adjustable clutch and means for controlling operation of said clutch in response to a demand for rapid power increase, said means for controlling clutch operation comprising:
    means for providing a desired engine speed;
    means for providing a measure of the actual engine speed;
    means for comparing said desired engine speed with said measure of said actual engine speed measure to provide an error signal representative of the difference between said desired engine speed and said actual engine speed; and
    means responsive to said error signal for providing an output signal representative of a required clutch engagement rate to allow said clutch to slip at a required controlled amount to facilitate an increase in said engine speed.

2. The system of claim 1 wherein said means for providing a desired engine speed includes:
    means for detecting the throttle angle of said engine; and
    means for providing an algorithm including a look-up table of desired engine speed as a function of throttle angle.

3. A continuously variable transmission system having a controllable variable speed component and an adjustable clutch and means for controlling operation of said clutch in response to a demand for rapid power increase, said means for controlling clutch operation comprising:
    means for providing a desired engine speed;
    means for comparing said desired engine speed with an actual engine speed measure to provide an error signal; and
    means responsive to said error signal for providing an output signal representative of a required clutch engagement rate to allow said clutch to slip a controlled amount to facilitate an increase in said engine speed;

said adjustable clutch being adjusted by regulating the change in fluid pressure in a servo chamber energizing said clutch, said means responsive to said error signal for providing an output signal representative of a required clutch engagement rate further comprising means responsive to said error signal for developing a pressure difference signal representative of desired clutch slippage;

means responsive to engine operating parameters for providing a pressure signal representative of incipient clutch slipping; and means responsive to said pressure signal and said pressure difference signal for providing an output signal representative of a clutch engagement rate required to allow the desired clutch slippage.

4. The system of claim 3 wherein said means for developing a pressure difference signal representative of a desired clutch slippage is adapted to limit the value of said signal to a predetermined level representative of a predetermined deceleration of a clutch output shaft.

5. A continuously variable transmission system having a controllable variable speed component and an adjustable clutch and means for controlling operation of said clutch in response to a demand for rapid power increase, said means for controlling clutch operation comprising:

means for providing a desired engine speed;

means for comparing said desired engine speed with an actual engine speed measure to provide an error signal; and means responsive to said error signal for providing an output signal representative of a required clutch engagement rate to allow said clutch to slip a controlled amount to facilitate an increase in said engine speed;

the engagement rate of said adjustable clutch being adjusted by changing the fluid pressure in a servo chamber energizing said clutch, said means responsive to said error signal for providing an output signal representative of a required clutch pressure further comprising means for determining said clutch cooling fluid temperature;

means for comparing the temperature of said clutch cooling fluid with a predetermined threshold temperature; and means for developing an output signal representative of a clutch fluid pressure that provides for a desired amount of slippage when the temperature of the clutch cooling fluid is less than said predetermined threshold and that provides for a non-slip clutch condition when said clutch cooling fluid temperature exceeds said predetermined threshold.

6. The system of claim 5 wherein said means for developing an output signal includes:

means for providing a first signal representative of the ratio at the variable speed component;

means for providing a second signal representative of the engine torque; and means responsive to said first and second signals for providing a third signal representative of the clutch fluid pressure required for non-slip operation of said clutch under normal operating conditions.

7. The system of claim 6 wherein said means responsive to said first and second signals is an algorithm contained in a look-up table for determining the non-slip clutch fluid pressure for a variety of engine parameters.

8. A continuously variable transmission system having a controllable variable speed component and a fluid pressure actuated clutch and means for controlling operation of said clutch in response to a demand for a rapid increase in power, said means for controlling clutch operation comprising:

means for providing a desired engine speed;

means for providing a measure of the actual engine speed;

means for comparing said desired engine speed with said measure of said actual engine speed to provide an error signal representative of the difference between said desired engine speed and said actual engine speed;

means responsive to said error signal for developing a clutch fluid pressure difference signal representative of a desired clutch slippage;

means responsive to the operating parameters of the engine for providing a clutch fluid pressure signal representative of incipient clutch slipping; and means responsive to said clutch fluid pressure signal and said clutch fluid pressure difference signal for providing an output pressure signal representative of a clutch fluid pressure required to allow the desired clutch slippage.

9. The system of claim 8 wherein said means responsive to said error signal for providing an output signal representative of a clutch fluid pressure required to allow the desired clutch slippage comprises:

means for determining the clutch cooling fluid temperature;

means for comparing the temperature of said clutch cooling fluid with a predetermined threshold temperature; and means for developing an output signal representative of a clutch fluid pressure that provides for a desired amount of slippage when the temperature of the clutch cooling fluid is less than said predetermined threshold and that provides for a non-slip clutch condition when said clutch cooling fluid temperature exceeds said predetermined threshold.

10. The system of claim 9 wherein said means for developing an output signal includes:

means for providing a first signal representative of the ratio at the variable speed component;

means for providing a second signal representative of the engine torque; and means responsive to said first and second signals providing a third signal representative of the clutch fluid pressure required for non-slip operation of said clutch under normal operating conditions.

11. The system of claim 10 wherein said means responsive to said first and second signals is an algorithm contained in a look up table for determining the non-slip clutch fluid pressure for a variety of engine parameters.

12. The system of claim 8 wherein said means for developing a clutch fluid pressure difference signal representative of a desired clutch slippage is adapted to limit the value of said signal to a predetermined level representative of a predetermined deceleration of the output shaft of said clutch.

13. The system of claim 8 wherein said means for providing a desired engine speed includes:

means for detecting the throttle angle of said engine; and means for providing an algorithm including a look-up table of desired engine speed as a function of throttle angle.

14. A continuously variable transmission system having a controllable variable speed component and a fluid pressure actuated clutch and means for controlling operation of said clutch in response to a demand for a rapid increase in power, said means for controlling clutch operation comprising:
  means for providing a desired engine speed;
  means for providing a measure of the actual engine speed;
  means for comparing said desired engine speed with said measure of said actual engine speed to provide an error signal representative of the difference between said desired engine speed and said actual engine speed;
  means responsive to said error signal for developing a first signal representative of a desired clutch fluid pressure adjustment to allow for a controlled amount of slippage;
  means responsive to engine operation parameters for providing a second signal representative of incipient clutch slipping; and
  means for developing a third signal representative of a required clutch fluid pressure in response to said first and second signals;
  means for developing a fourth signal representative of a clutch fluid pressure during normal operating of said actual engine speed;
  means for comparing said third signal with said fourth signal for output of a fifth signal equal to the lower of said third and fourth signals; and
  means for comparing the temperature of the clutch cooling fluid with a predetermined limiting temperature for developing an output signal representative of a desired clutch fluid pressure, said output signal being equal to said fifth signal when the temperature of the clutch cooling fluid is less than the predetermined limit and equal to said fourth signal when the fluid temperature is greater than the predetermined limit.

15. The system of claim 14 wherein said means for developing a first signal representative of a desired clutch slippage is adapted to limit the value of said first signal to a predetermined level representative of a predetermined deceleration of the output shaft of said clutch.

16. The system of claim 15 wherein said means for developing said fourth signal includes:
  means for providing a measure of the output speed of said variable component;
  means for developing a sixth signal representative of the ratio of said actual engine speed and the output speed of the variable component;
  means for determining the engine torque from the throttle angle and the engine speed; and
  means for output of a signal in response to a schedule requiring input of said engine torque and said ratio.

* * * * *